June 10, 1947.   J. NORSTROM ET AL   2,422,121
FLUID PRESSURE OPERATED BRAKE AND ADJUSTMENT THEREFOR
Filed Aug. 10, 1945   4 Sheets-Sheet 1

INVENTORS
Joseph Norstrom
BY Alvin L. Smith
Ward, Crosby + Neal
ATTORNEYS

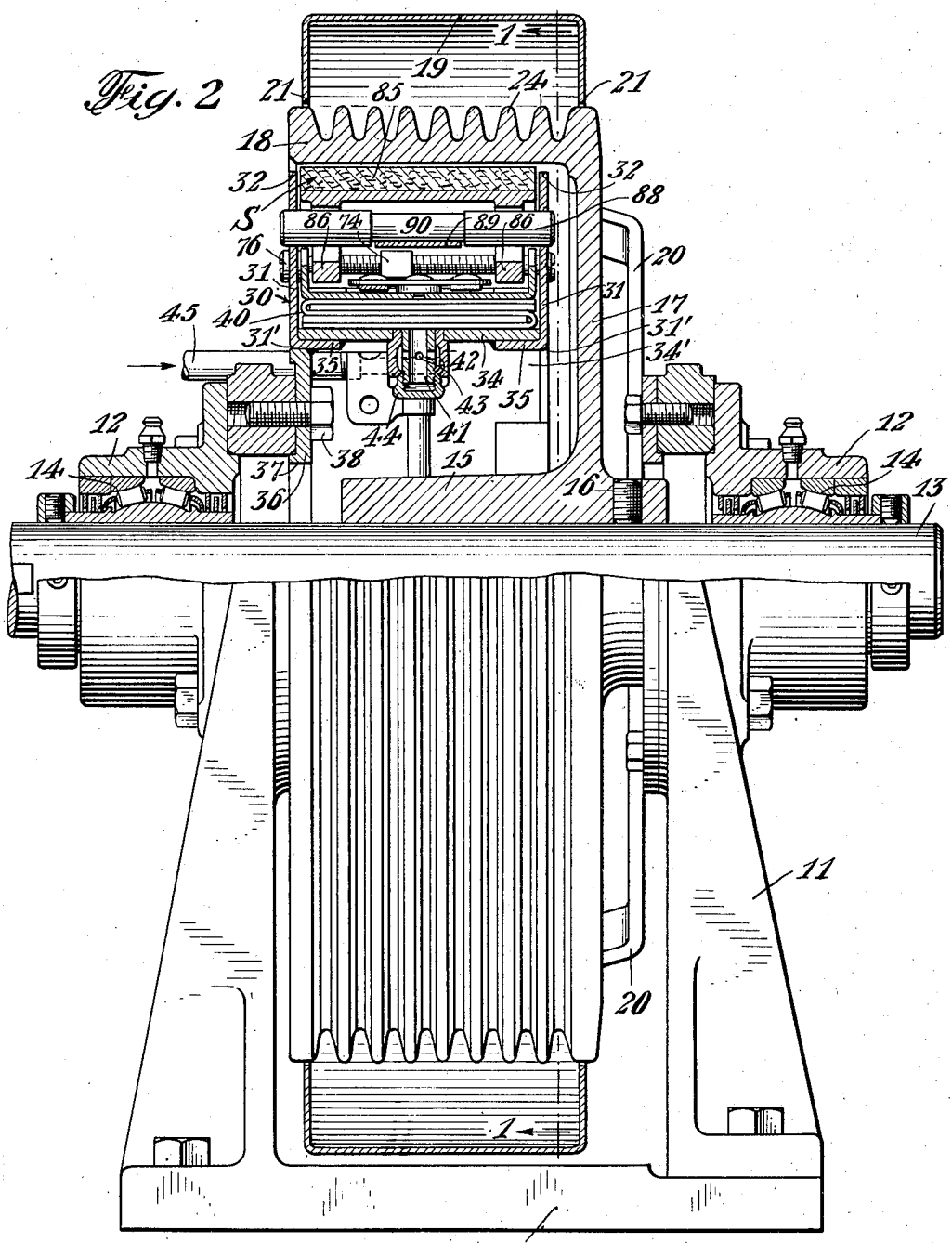

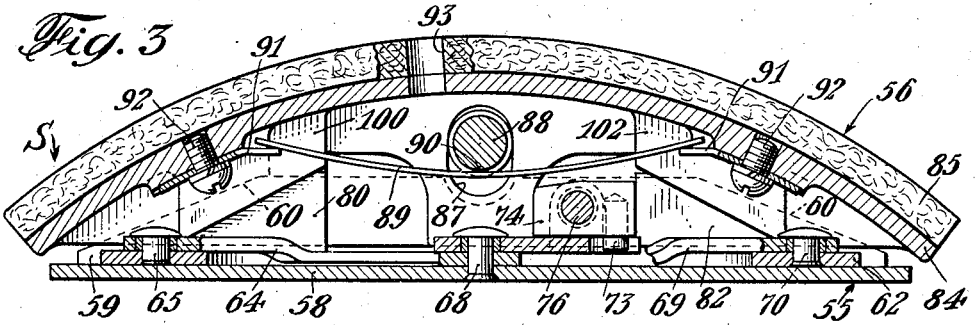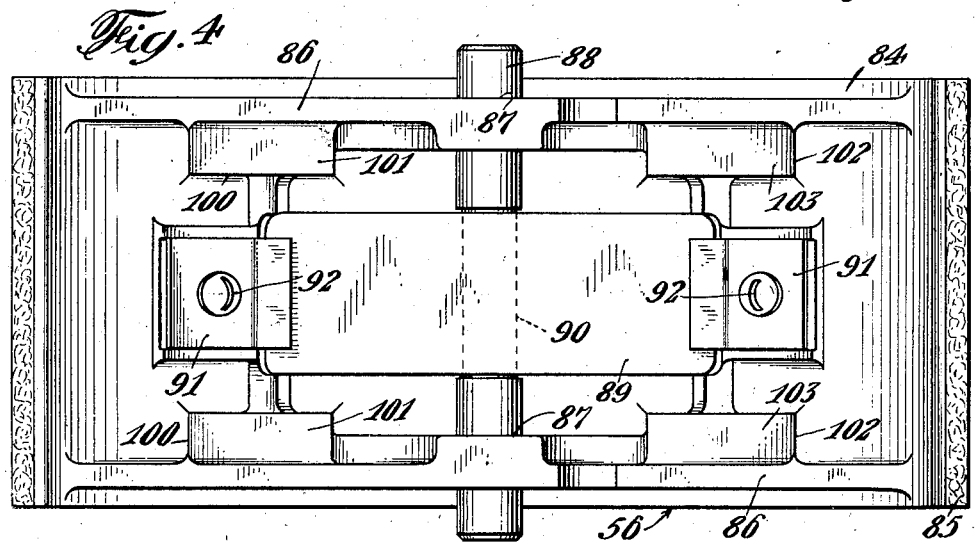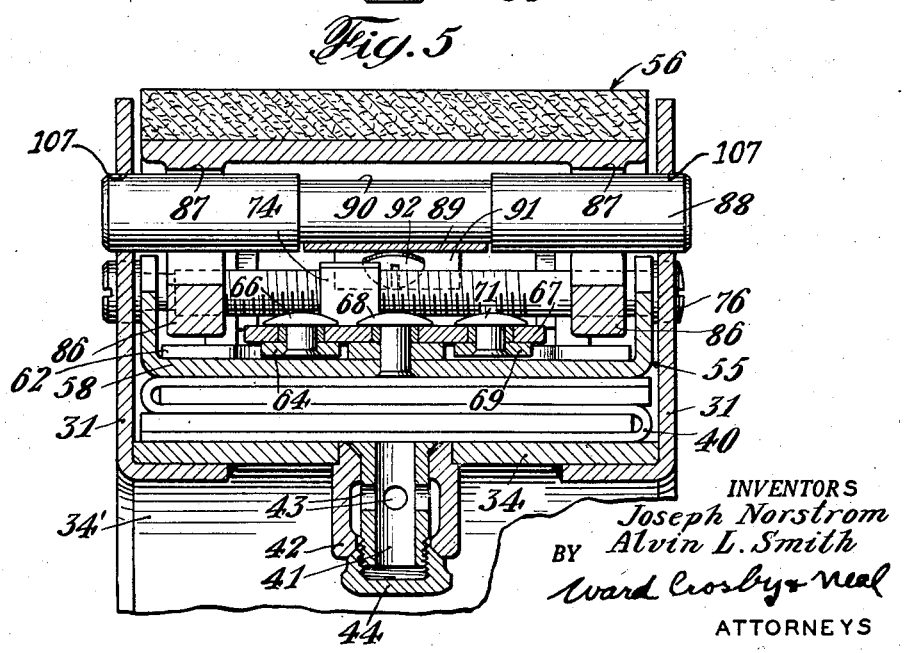

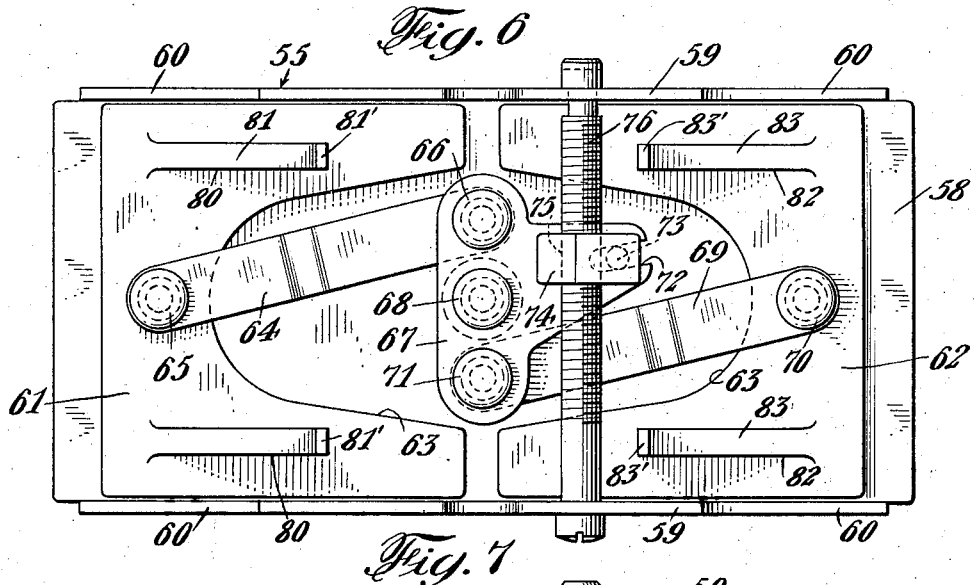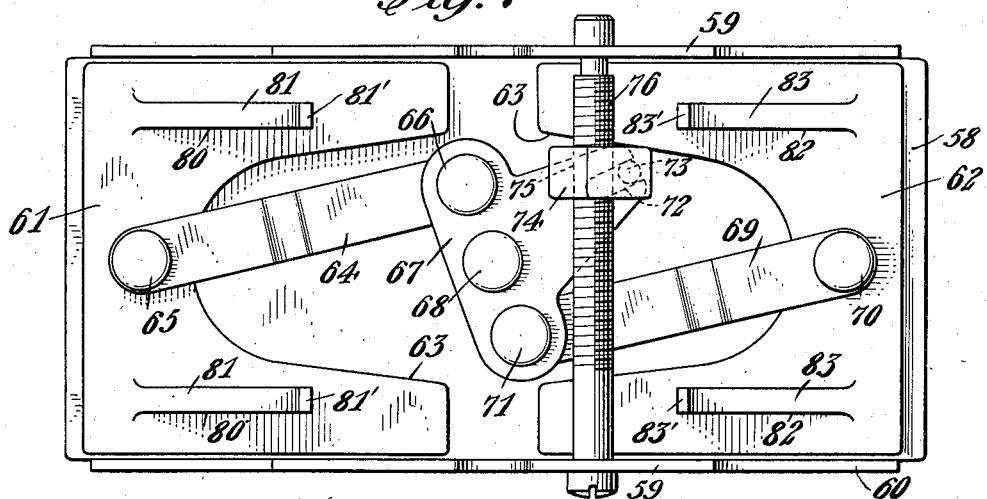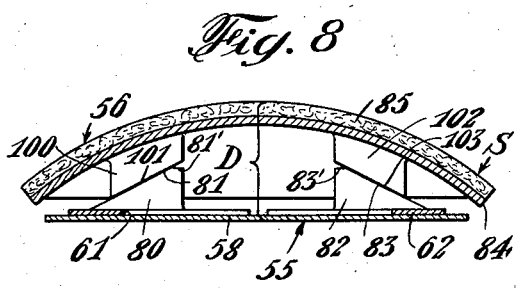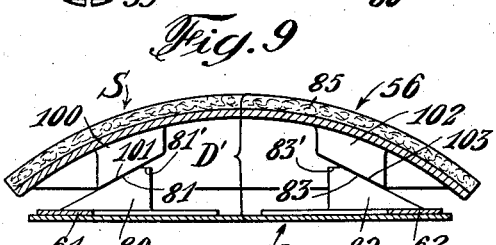
INVENTORS
Joseph Norstrom
BY Alvin L. Smith
Ward, Crosby & Neal
ATTORNEYS Patented June 10, 1947

2,422,121

UNITED STATES PATENT OFFICE 2,422,121

FLUID PRESSURE OPERATED BRAKE AND ADJUSTMENT THEREFOR

Joseph Norstrom and Alvin L. Smith, Newburgh, N. Y., assignor to Muskegon Machine Company, Newburgh, N. Y., a corporation of Delaware Application August 10, 1945, Serial No. 610,040

8 Claims. (Cl. 188—79.5)

This invention relates to fluid-pressure operated brakes and, more particularly, to adjusting mechanism therefor.

In braking apparatus, the clearance between the brake drum and the shoes which carry the brake lining is an important factor in obtaining an even torque. This is especially true of brakes in which the braking torque results from pressure exerted by expanding bellows or diaphragms on the respective brake shoes. When a very slight clearance is accurately maintained between the brake drum and the brake linings, the bellows movement may be kept to a minimum with the result that the wear of the bellows is considerably reduced and a more even torque is obtained. It is important that this clearance be quite accurately adjusted upon installation of the brake. Moreover, as the brake linings are worn down, it is desirable to adjust the clearance between the linings and the drum to compensate for the lining wear.

With the apparatus of this invention, the clearance between the brake linings and the drum may be easily adjusted in a very short time without removing the brake drum or disassembling any parts of the brake mechanism. Consequently, the clearance between the brake drum and the linings may be periodically checked and easily adjusted to secure a minimum motion of the bellows. Moreover, the brake may be adjusted so that a uniform clearance is accurately maintained between each brake shoe and the drum even when a large number of brake shoes are utilized. One way of accomplishing this result is to utilize a two-section brake shoe assembly, the inner section receiving the pressure exerted by the bellows and transmitting this pressure to the outer section which is in contact with the brake drum. According to the invention, the spacing between such inner and outer sections may be readily adjusted by a relatively simple and improved form of mechanism, to thereby vary the clearance therebetween. The brake shoe of the invention is of rugged and durable construction so that it will require little attention for proper maintenance.

Brake shoes, according to this invention, are also constructed so that they may be easily removed from the brake housing for relining or adjustment. When the shoe is removed, the other parts of the braking apparatus, such as the bellows, are readily accessible for inspection or removal.

Various other objects, features and advantages of the invention will clearly appear from the detailed description given below taken in connection with the accompanying drawings forming a part of the specification and illustrating, by way of example, one form of apparatus which may be used in carrying out the invention. The invention resides in such novel features, arrangements, and combinations of parts as may be shown and described in connection with the apparatus herein disclosed.

In the drawings,

Fig. 2 is a side elevational view, partially in section, of braking apparatus, constructed in accordance with the invention;

Fig. 3 is a sectional elevational view of one of the brake shoes;

Fig. 4 is an inverted plan view of the outer section of one of the brake shoes;

Fig. 5 is a sectional view taken substantially along the line 5—5 of Fig. 1;

Figs. 6 and 7 are plan views of the inner section of the brake shoe showing the parts in different positions, respectively; and Figs. 8 and 9 are somewhat diagrammatic views illustrating certain features of the invention.

Figure 1:
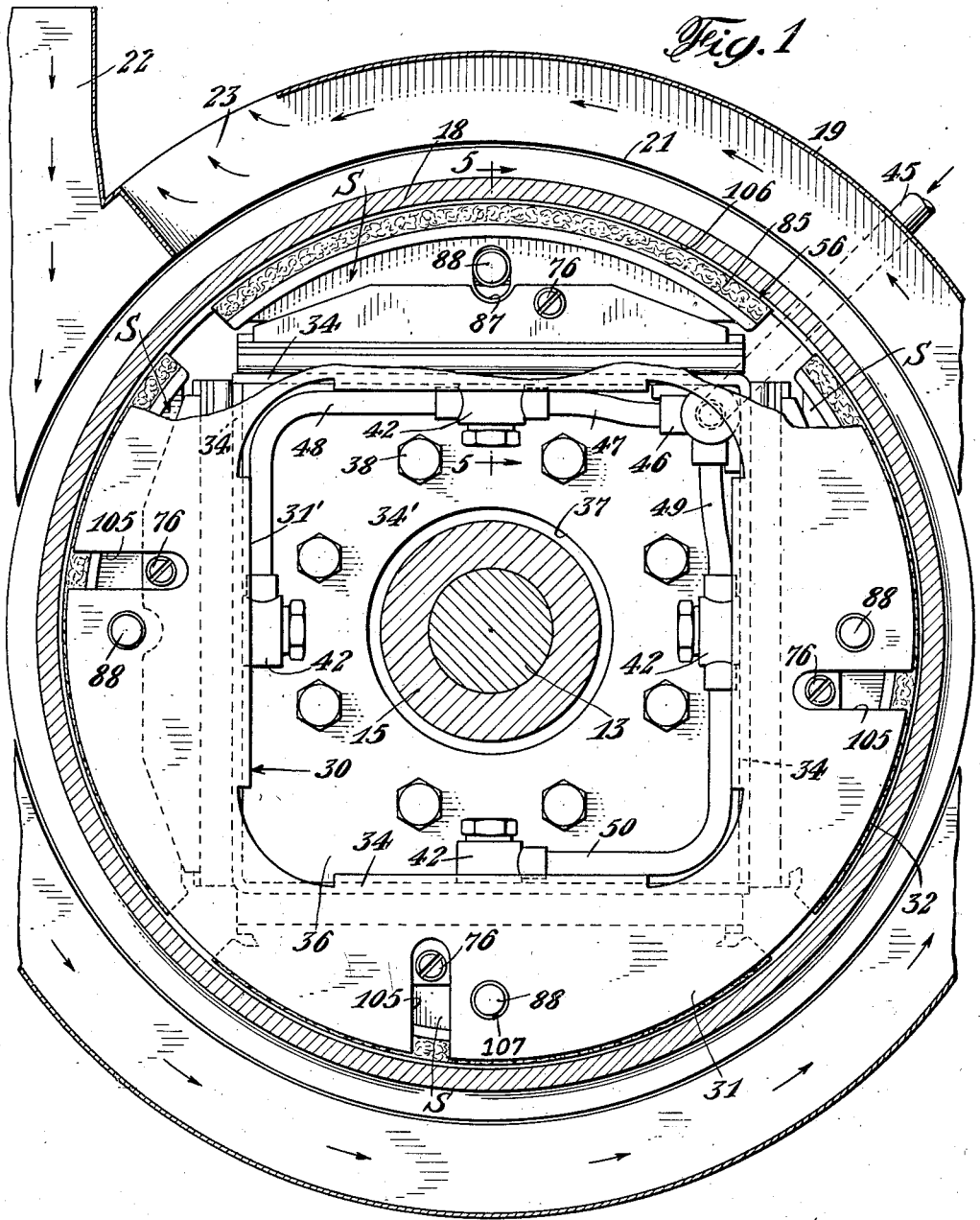
Fig. 1 is a view of the braking apparatus taken along the line 1—1 of Fig. 2.

One suitable form of brake assembly will first be described of a type adapted for various industrial purposes, and utilizing four of the adjustable brake shoe arrangements in accordance with the invention. However, it will be understood that the features of the invention may be used in connection with various other types of brake assemblies for a variety of purposes.

Referring to the drawings in detail and particularly Figs. 1 and 2, the braking apparatus may comprise a base 10 which supports a suitable frame 11, having bearing blocks 12, 12 mounted thereon. A shaft 13, to which a braking torque may be applied in the manner hereinafter described, is journaled in the bearing blocks 12, 12 on bearings 14, 14, respectively. A sleeve 15 is secured to the shaft 13 by suitable set screws, one of which is shown at 16, Fig. 2, the sleeve 15 having a web 17 formed integrally therewith which, in turn, is integral with a cylindrical brake drum 18.

A housing 19 is supported in any suitable manner as by members 20 which may be fixed to the frame 11 and extend outwardly in a generally radial direction with respect to the shaft 13. As is shown best in Fig. 1, the housing 19 substantially surrounds the brake drum 18 and is separated therefrom by clearance gaps as at 21. The housing 19 is provided with an inlet as at 22 and an outlet as at 23 so that air or other cooling medium may be passed into the inlet 22, thence in a generally counter-clockwise direction, Fig. 1, around the brake drum 18 and out through the outlet 23. If desired, the outer surface of the brake drum may be corrugated as indicated at 24, Fig. 2, to facilitate cooling thereof as the braking operation proceeds.

A brake shoe support 30, Figs. 1 and 2, is provided to support any desired number of brake shoes S in proximity to the inner surface of the brake drum 18. In the example shown, there are four brake shoes S spaced at 90 degrees around interiorly of the brake drum 18. The brake shoe support 30 may comprise a pair of spaced plate members 31, 31 disposed, respectively, adjacent opposite ends of the brake drum 18, Fig. 2. Each plate member 31 comprises a generally circular peripheral portion 32 which is closely spaced with respect to the adjacent inner surface or rim of the brake drum 18. Plates 34 are disposed between the plate members 31 and 31, each plate 34 being brazed or otherwise suitably secured to flanges 35, Fig. 2, formed on the plate members 31, respectively. The plates 34 form a passage 34' which may be substantially square in transverse section, the shaft 13 extending through this passage. Each of the plate members 31 is apertured as indicated at 31', these apertures having transverse configurations corresponding with that of the aforesaid passage 34'.

Accordingly, it will be apparent that the brake shoe support 30 comprises the plate members 31, 31 and plates 34 which form a rigid unitary structure. Each of the plates 34, Fig. 1, is adapted to support one of the brake shoes S in desired closely spaced position relative to the rim of the brake drum 18 as will be more fully described hereinafter. In order to secure the brake shoe support 30 to the frame 11, a web 36 may be brazed or otherwise suitably secured to the inner surface of the left hand plate member 31, Fig. 2, said web 36, incidentally, partially closing the aforesaid aperture 31' of the plate member 31 last noted, and being shaped to form a central passage 37, Fig. 1, which is of sufficient size to receive freely the shaft 13. The web 36 is secured to the frame 11 by suitable screws 38 to thereby hold said web 36 together with the brake shoe support 30 in fixed position upon the frame 11.

Each of the plates 34 supports a bellows or diaphragm 40, Fig. 2, to which is connected a pipe 41 extending through a sleeve 42 mounted in a suitable bore formed in the central portion of the adjacent plate 34. Each pipe 41 is provided with a plurality of bores 43 which communicate with the interior of the surrounding sleeve 42 and each sleeve 42 is provided with a cap 44 to close off the end thereof and provide access to the pipe 41. When the brake drum 18 and the brake shoes S are removed in the manner hereinafter described, one or more of the caps 44, to which access may be had, after removing the brake drum, may be removed whereupon one or more of the bellows 40 may be lifted out for replacement or adjustment.

It will be apparent that the sleeves 42, which extend through the respective plates 34, are located above, below and at both sides of the shaft 13, Fig. 1, respectively. Air may be supplied to each of the bellows 40 through a supply line 45 which communicates with one port in a three-way connection 46. A conduit 47 connects a second port of the three-way connection 46 with the sleeve 42 for the upper diaphragm (Figs. 1 and 2).

A conduit 48 conducts the air to another sleeve 42 for the left hand diaphragm. The third port of the three-way connection 46 is connected by a conduit 49 with the sleeve 42 for the right hand diaphragm, which, in turn, has a conduit 50 extending therefrom to the sleeve 42 for the bottom diaphragm. Accordingly, the air passes from supply line 45 into each of the sleeves 42 and thence through the pipes 41 into the respective bellows 40.

It will be understood that the air supply may be controlled in any well known manner so that the bellows 40 may be inflated or deflated to the desired extent when operating the brake.

One of the brake shoes S is mounted on each of the bellows 40, each brake shoe S comprising an inner or shoe section 55 and an outer section or braking section 56, Fig. 3. The inner section 55 may comprise a flat base 58, Figs. 6 and 7, which is adapted to rest upon the associated bellows 40. Walls as at 59 extend along each side of the base 58 and may be integral therewith, each side wall 59 having tapered ends as indicated at 60, Fig. 3. A pair of slides 61, 62 are mounted between the side walls 59, 59, both of said slides resting on and being movable longitudinally of the base 58. The facing ends of these slides are cut away to form U-shaped and oppositely directed recesses 63, 63, respectively, which are symmetrical with respect to the side walls 59, 59. One end of a link 64 is pivoted to slide 61, as at 65, the other end of link 64 being pivoted as at 66 to a yoke 67 which is pivoted to the base 58 as at 68.

One end of a link 69 is pivoted to the slide 62 as at 70, the other end of link 69 being pivoted to the yoke 67 as at 71. The yoke 67 is slotted as at 72 to receive a pin 73 which is mounted on a nut member 74, the lower surface of which rests on the yoke 67. A bore 75 extends transversely through the nut member 74, this being internally threaded to receive an adjusting screw 76 which is rotatably mounted in the side walls 59. Such adjusting screw may be provided with slotted heads at both ends thereof to receive a screwdriver or other suitable tool. Assuming that the slides 61, 62 are in the position shown in Fig. 6, the adjusting screw 76 may be turned so as to move the nut member 74 upwardly, thus swinging the yoke 67 in a counterclockwise direction, Fig. 6, and moving the slides 61, 62 away from each other toward positions as shown in Fig. 7. Obviously, when the adjusting screw 76 is turned so as to move the nut member 74 downwardly, Fig. 7, the reverse action occurs and the slides 61, 62 move closer together.

The slide 61 has a pair of integral parallel wedge-shaped portions 80, 80 formed at opposite sides thereof, respectively. Each portion 80 has an inclined upper surface 81, Fig. 8, and these inclined surfaces are disposed in a common plane. The upper portion of each inclined surface 81 may, if desired, merge into a short horizontal portion 81' which is located at the end of the member 80 nearest the yoke 67. Another pair of wedge-shaped portions 82, 82 may be formed integrally with the slide 62 at opposite sides thereof, respectively. The portions 82, 82 have inclined surfaces 83, 83, respectively, which may merge into horizontal portions 83' at the upper end thereof. The wedge-shaped members 80 and 82 are oppositely directed and are preferably located the same distance from the adjacent side wall 59.

The outer section 56 of each brake shoe S comprises an arcuate plate segment 84 which has the same curvature as the rim of the brake drum 18, Fig. 1. A brake lining 85 of asbestos composition or other suitable material is secured to the outer surface of the plate segment 84 in any suitable manner. A side wall 86 extends along each side of the arcuate plate 84 and may be formed integrally therewith. The side walls 86 are drilled at the middle thereof to form the respective slots 87, Fig. 5, within which is received a rod 88 extending transversely of the outer section 56. A leaf spring 89 fits in an annular recess 90 formed in the central portion of the bar 88, and the spring 89 is supported at each end thereof by a member 91 which is suitably secured to the arcuate segment 84 as by a screw 92. The spring 89 serves to retract the brake shoe from engagement with the drum as will be hereinafter described and said spring 89 also serves to prevent the rod 88 from sliding transversely of the outer section 56 when the spring engages the recessed portion 90 of the rod 88.

As shown in Fig. 3, a passage 93 is formed in the brake lining 85 and arcuate segment 84, this passage being slightly offset with respect to the center of the brake shoe. A suitable tool may be inserted through this passage to depress the spring 89 and move same out of the recess 90 when it is desired to insert or remove the rod 88 for reasons hereinafter explained.

Referring to Fig. 4, a pair of portions 100, 100 may be formed integrally with the arcuate segment 84 at the left hand side of the brake shoe. The portions 100 have inclined surfaces 101, respectively, which are adapted to engage the respective inclined surfaces 81 on the wedge-shaped portions 80. A pair of like portions 102, 102 may be formed integrally with the arcuate segment 84 at the right hand side of the brake shoe. Portions 102, 102 may be provided, respectively, with inclined surfaces 103, Fig. 8, which are adapted to engage the respective inclined surfaces 83 on the wedge-shaped members 82.

As previously stated, one of the brake shoes S is supported upon each of the bellows 40, all of which, in turn, may be supported against the respective plates 34. As shown best by Fig. 5, the inner section 55 of each brake shoe may be retained between the plate members 31, 31 with the base 58 in contact with the outer surface of the bellows 40. The adjusting screw 76 on each brake shoe may be received in slots 105 which are formed in the respective plate members 31.

The outer section 56 of each of the brake shoes is positioned and rests upon its complemental inner section 55 with the portions 100, 102, Fig. 8, in engagement with the wedge-shaped portions 80, 82, respectively. When so positioned, the brake lining 85 is closely adjacent the brake drum 18, the clearance between the lining 85 and the drum 18, which is indicated at 106, (Fig. 1) preferably being from about .005 inch to about .008 inch. When the brake shoe outer sections 56 are positioned as described, the rod 88 of each brake shoe extends through suitable passages 107, 107 in the respective plate members 31, so that each rod 88 is supported in fixed position relative to the brake shoe support 30.

When it is desired to reline or adjust one or more of the brake shoes, the brake drum 18 is removed and a suitable tool is inserted through the passage 93, Fig. 3, to force the spring 89 downwardly out of engaement with the recessed portion of the rod 88. Thereupon, said rod 88 may be moved out through the passages 87 and 107, Fig. 5, at either side of the brake shoe thus permitting the outer section 56 of the upper brake shoe to be lifted out. If desired, at this time, the inner brake shoe section 55 may be removed by a mere lifting action to allow access to the associated bellows. When the desired adjustments have been made, the inner section 55 is again placed upon the bellows and the outer section 56 is placed in position on top of the inner section 55. Thereupon, the spring 89 is again depressed and the rod 88 may be replaced. The spring 89 is then released whereupon it snaps into engagement with the recessed portion 90 of the rod 88. Accordingly, it will be apparent that the upper brake shoe may be very easily and conveniently removed for adjustment or for relining. Obviously, the remaining brake shoes may be removed in similar manner.

The operation of the brake will now be briefly described. It will be assumed that a bellows and a brake shoe are in position on each of the plates 34 and that the shaft 13 is rotating. When it is desired to apply a braking torque to the shaft, air under pressure is supplied to the air line 45 thus causing all of the bellows 40 to expand and press the respective brake linings 85 against the interior of the drum 18 to thereby apply a braking torque to the shaft 13, each brake shoe moving radially outward against the pressure of the spring 89 associated therewith. When the bellows are deflated by exhausting the air from the line 45, the springs 89 retract the respective brake shoes whereupon the brake linings 85 are moved radially inward away from the brake drum and no braking torque is applied thereto. It will be apparent that the braking torque is applied over substantially the whole circumference of the drum 18 so that a very even braking torque is obtained and excessive wear of the brake lining is avoided. If the temperature of the brake lining rises to approximately 500° F., the brake drum should be cooled in the manner hereinbefore described by passing air or other cooling fluid around the outer surface of the brake drum through the housing 19.

In accordance with the invention, the clearance 106, Fig. 1, between the brake drum 18 and the respective brake shoe S may be adjusted without removing the brake drum. This clearance may be readily and accurately adjusted when the brake is first installed and periodical adjustments may be made to maintain the optimum clearance between the brake shoe and the brake drum. The adjustment of the clearance 106 is effected by means of the adjusting screw 76 for each brake shoe S and the method of making such adjustments will now be described in detail. It will be assumed that the inner section 55 and outer section 56 of the upper brake shoe S are in the respective positions shown in Figs. 3 and 8 with the wedge-shaped portions 80 and 82 in contact with the portions 100 and 102, respectively. In this position, the distance between the middle of the base 58 and the outer surface of the brake lining is indicated at D, Fig. 8. The adjusting screw 76, Fig. 6, may be turned so as to move the slides 61, 62, Fig. 8, farther apart whereupon the portions 100 and 102 are forced upwardly, surfaces of portions 80 and 82, sliding thereover respectively, for example, to the positions shown in Fig. 9. It will be apparent that the distance D becomes greater as at D' in response to this adjustment, with the result that the brake lining 85 moves closer to the rim of the brake drum, and the clearance 106 becomes smaller.

When the adjusting screw 76 is turned so as to move the slides 61, 62 toward each other, the reverse action occurs and the portions 100 and 102, Fig. 9, move downwardly, since the surfaces of portions 80 and 82 slide inwardly. Thereupon, the brake lining 85 moves away from the brake drum, and the clearance 106 is increased.

In this manner, a very fine adjustment may be obtained of the clearance between the brake shoes and the drum and this clearance may be kept to the minimum so that the expanding movement of the bellows is confined within narrow limits. It will be further apparent that a uniform clearance may be accurately maintained between each brake shoe and the brake drum so that a very even braking torque may be obtained. Moreover, the adjusting screws are readily accessible from either end of the brake so that this clearance may be adjusted without removing the brake drum or disassembling the brake in any manner. The correct clearance 106 between the brake lining 85 and the brake drum 18 may be conveniently obtained by temporarily inserting a shim having a thickness corresponding to the desired clearance.

It will further be apparent that the brake is of a very rugged and durable construction requiring only low maintenance costs. Also, the only moving parts of the brake which require lubrication are the threads on the adjusting screw 76 and nut member 74. By making periodic adjustments to maintain the proper clearance between the brake shoes and the brake drum, the life of each bellows is extended and same will only need to be replaced at infrequent intervals.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a brake construction, a brake shoe comprising an outer section having a brake lining adapted to engage a brake drum, an inner section having a pressure-receiving surface, a leaf spring mounted on said outer section, said brake shoe being formed to receive a longitudinally slidable supporting rod, the ends of said rod normally extending outwardly from the sides of said brake shoe, said rod being provided with an annular recessed portion adapted to receive said leaf spring to lock the rod in fixed transverse position with respect to the brake shoe, said outer section and said brake lining being shaped to form a passage through which a tool may be inserted to move said leaf spring out of said annular recess so that the rod may be removed.

2. In a fluid pressure operated brake having a brake drum, means for supporting a brake shoe in operative relation with respect to said drum, said brake shoe having an arcuate surface of substantially the same curvature as said brake drum, fluid pressure operated means for moving said shoe toward the drum so as to apply a braking torque to said drum, a pair of slide members mounted on said fluid pressure operated means, said slide members comprising wedges for cooperating with said shoe to move the latter toward or away from said drum, wedge portions on said shoe for cooperating with said slide members, a yoke mounted upon said fluid pressure operated means intermediate said slide members, means operatively connecting said yoke to said slide members, and means for controlling the angular position of said yoke whereby said slide members may be moved toward or away from one another to vary the distance between said shoe and said fluid pressure operated means.

3. In a brake construction, a brake shoe comprising an inner section having a pressure receiving surface, a pair of slide members mounted upon said surface, each of said slide members comprising a wedge, the wedges on said members being oppositely directed, a yoke member pivotally mounted on said pressure receiving surface intermediate said slide members, a pair of links operatively associated each with an opposite extremity of said yoke member and interconnecting said yoke member with respective of said slide members, an adjusting screw having a traveling nut thereon, said nut being operatively associated with said yoke, said screw being accessible from the side of said shoe and mounted upon said pressure receiving surface and adapted for controlling the angular position of said yoke; said brake shoe further comprising an outer section having a braking surface adapted to engage a brake drum, said outer section having wedge members adapted respectively to engage the oppositely directed wedge members mounted upon said slides, the relative movement between said wedges being effective to move said outer wedge members thereby to increase or decrease the distance between said pressure receiving surface and said braking surface.

4. In a fluid pressure operated brake having a brake drum, a plurality of brake shoes, a support for maintaining said brake shoes in operative relation with said drum, each of said brake shoes comprising an inner section adapted to be moved toward the brake drum, said inner section carrying a plurality of sets of wedging portions, a yoke member pivotally mounted intermediate said wedging portions, links operatively interconnecting opposite extremities of said yoke to respective of said wedging portions, a threaded adjusting member having a nut thereon operatively connected to said yoke whereby angular adjustment of said threaded member the distance between said wedging portions may be increased or decreased, said threaded adjusting member being accessible from the side of said brake shoe, each of said brake shoes further comprising an outer section movable toward the brake drum with said inner section, each of said outer sections comprising a brake lining adapted to engage and apply a braking torque to said brake drum, a plurality of wedge members adapted respectively to engage said sets of wedging portions on the associated inner section, so that angular motion of the threaded adjusting member on each brake shoe is effective to adjust the clearance between the associated brake lining and the brake drum.

5. In a brake construction, a brake shoe comprising an outer section having a brake lining adapted to engage a brake drum, an inner section having a pressure receiving surface, a leaf spring mounted on said outer section, said brake shoe being formed to receive a longitudinally slidable supporting rod, said rod being provided with a recess adapted to receive said leaf spring to lock the rod in fixed transverse position with respect to the brake shoe, said outer section and said brake lining being shaped to form a passage through which a tool may be inserted to disengage said spring from said recess so that the rod may be removed.

6. In a fluid pressure operated brake having a brake drum, four or more brake shoes substantially equally angularly spaced, a support for maintaining said brake shoes in operative relation with respect to said drum, each of said brake shoes comprising an inner section adapted to be moved toward the brake drum, a plurality of wedge members slidably mounted upon said inner section, a yoke member pivotally mounted upon said inner section, means for operatively interconnecting said yoke and said wedge members, said means being so constructed and arranged that angular motion of the yoke moves said wedge members relative to said inner section, a threaded adjusting member operatively associated with said yoke for controlling the angular position thereof, said threaded adjusting member being accessible from the side of said brake shoe, each of said brake shoes further comprising an outer section movable toward the brake drum with said inner section, each of said outer sections comprising a brake lining adapted to engage said brake drum, a like plurality of wedge engaging members mounted upon said outer section and adapted respectively to engage said wedge members on the associated inner section, so that angular adjustment of the threaded adjusting member on each brake shoe is effective to adjust the clearance between the associated brake lining and the brake drum.

7. In a brake construction, a brake shoe comprising an outer section having a brake lining adapted to engage a brake drum, an inner section having a pressure receiving surface, the sides of said outer section being slotted to receive slidably a supporting rod, the ends of said rod normally extending outwardly from the sides of said brake shoe, a leaf spring normally operable to lock said rod in fixed transverse position with respect to the brake shoe and manually releasable to permit removal of said rod, said spring being adapted for resiliently urging said outer section toward said inner section, a pair of slide members mounted on said inner section, said slide members comprising wedges for cooperating with said outer section, wedge portions on said outer section for cooperating with said slide members, means for controlling the relative position of said slide members whereby in cooperation with said spring said outer section is movable away from or toward said inner section, said leaf spring being effective yieldingly to retract the brake shoe from the brake drum when no braking torque is being applied to said brake drum.

8. In a brake construction, a brake shoe comprising an outer section having a brake lining adapted to engage a brake drum, an inner section having a pressure receiving surface, the sides of said outer section being slotted slidably to receive a supporting rod, a leaf spring normally operable to lock said rod in a fixed transverse position with respect to the brake shoe and manually releasable to permit removal of said rod, said leaf spring engaging said rod and said outer section yieldingly to urge said outer section toward said inner section, wedge means mounted upon said inner section and adapted for movement relative thereto whereby said outer section is movable toward or away from said inner section in response to said relative movement of the wedge means and in response to the yielding action of said leaf spring, the latter being effective to retract the brake shoe from the brake drum when no braking action is applied to said brake drum.

JOSEPH NORSTROM.
ALVIN L. SMITH.

REFERENCES CITED

The following references are of record in the file of this patent:

UNITED STATES PATENTS

| Number | Name | Date |
|---|---|---|
| 1,780,200 | Linderman | Nov. 4, 1930 |
| 2,155,221 | Farmer | Apr. 18, 1939 |